US00RE42328E

(19) United States
(12) Reissued Patent
Son et al.

(10) Patent Number: US RE42,328 E
(45) Date of Reissued Patent: May 10, 2011

(54) WASHING MACHINE WITH TILTED WASHING TUB

(75) Inventors: Ji Chang Son, Changwon-si (KR); Hye Yong Park, Changwon-si (KR); Bong Sang Lee, Changwon-si (KR); Chang Won Ryu, Changwon-si (KR)

(73) Assignee: LG Electronics Inc., Seoul (KR)

(21) Appl. No.: 11/710,609

(22) Filed: Feb. 26, 2007

Related U.S. Patent Documents

Reissue of:
(64) Patent No.: 6,584,814
Issued: Jul. 1, 2003
Appl. No.: 09/837,385
Filed: Apr. 19, 2001

U.S. Applications:
(63) Continuation of application No. 10/684,322, filed on Oct. 8, 2003, now abandoned.

(30) Foreign Application Priority Data

Apr. 19, 2000 (KR) ..... 2000-20736

(51) Int. Cl.
*D06F 23/06* (2006.01)
(52) U.S. Cl. ..... 68/24; 68/3 R; 68/133
(58) Field of Classification Search ..... 68/3 R, 68/24, 133
See application file for complete search history.

(56) References Cited

U.S. PATENT DOCUMENTS

| | | | | | |
|---|---|---|---|---|---|
| 1,519,475 | A | * | 12/1924 | Altorfer | 68/171 |
| 2,583,823 | A | * | 1/1952 | Dunham | 68/25 |
| 4,526,020 | A | * | 7/1985 | Fey et al. | 68/3 R |
| 5,090,220 | A | * | 2/1992 | Fukuzawa et al. | 68/3 R |
| 5,442,937 | A | * | 8/1995 | Kwon | 68/4 |
| 5,661,914 | A | * | 9/1997 | Millet | 34/601 |
| 5,711,171 | A | * | 1/1998 | Uhlin | 68/4 |

FOREIGN PATENT DOCUMENTS

ES 2076880 * 11/1995

* cited by examiner

*Primary Examiner* — Frankie L Stinson
(74) *Attorney, Agent, or Firm* — McKenna Long & Aldridge LLP

(57) ABSTRACT

Disclosed herein is a washing machine with a tilted washing tub. The washing machine includes a casing on the rear portion of which an opening is formed. The opening is covered with a rear cover provided with an outward protrusion. A washing tub consists of outer and inner tubs. The outer tub is positioned in the casing to be tilted forward at a predetermined angle for containing washing water. The inner tub is positioned in the outer tub for washing and spin-drying laundry. Drive means is positioned under the outer tub to rotate the [outer] *inner* tub.

20 Claims, 5 Drawing Sheets

Fig.3 Amended
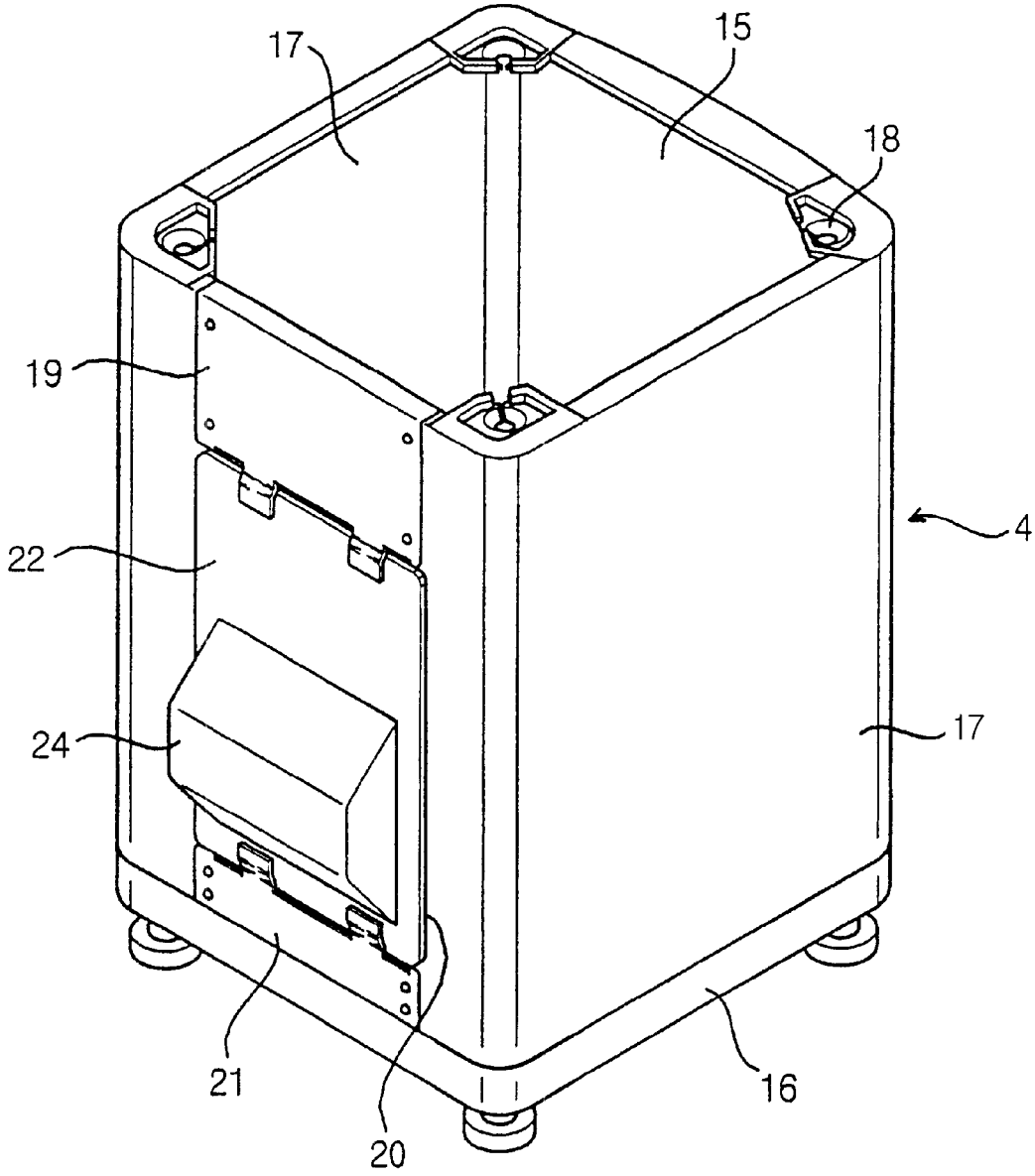

WASHING MACHINE WITH TILTED WASHING TUB

Matter enclosed in heavy brackets [ ] appears in the original patent but forms no part of this reissue specification; matter printed in italics indicates the additions made by reissue.

*This application is a continuation application from reissue application Ser. No. 10/684,322 filed on Oct. 8, 2003, now ABN, which is a reissue of U.S. Pat. No. 6,584,814, filed on Apr. 19, 2001, 09/837,385, which is hereby incorporated by reference in their entirety.*

BACKGROUND OF THE INVENTION

1. Field of the Invention

The present invention relates generally to a washing machine with a tilted washing tub, and more particularly to a washing machine with a tilted washing tub, which is capable of allowing its casing to be perpendicular in the same manner as that for a washing machine with a perpendicular washing tub, despite the presence of the tilted washing tub.

2. Description of the Prior Art

In general, a washing machine with a tilted washing tub allows the front upper portion of its washing tub to be tilted forward, thereby allowing a user to conveniently put laundry into and take laundry out of its washing tub.

FIG. 1 is a cross section showing a prior art washing machine with a tilted washing tub.

The prior art washing machine with a tilted washing tub includes a casing 104, which is provided with a folding door 102 and constitutes the outer periphery of the washing machine. A washing tub 105 is positioned in the casing 104 to be tilted forward at a predetermined angle. The washing tub 105 is comprised of an outer tub 106 situated in the casing 104 to be tilted at a predetermined angle for containing washing water, and an inner tub 108 situated in the outer tub 106 for washing and spin-drying laundry. A drive motor 110 is situated under the outer tub 106 to rotate the [outer] *inner* tub [106] *108*. A plurality of suspension rods 112 serve to support the outer tub 106 and damp vibrations.

The outer and inner tubs 106 and 108 are situated to be tilted forward at a predetermined angle. Accordingly, an front upper protrusion 116 is formed on the upper sub-portion of the front portion of the casing 104 to correspond to the shape of the front upper portion of the tilted washing tub 105, and a rear lower protrusion 118 is formed on the lower sub-portion of the rear portion of the casing 104 to correspond to the shape of the rear lower portion of the tilted washing tub 105.

However, in the prior art washing machine, it is inconvenient to put laundry into and take laundry out of the inner tub 108 because the front upper protrusion 116 of the casing 104 is projected forward and the inner tub 108 is spaced apart from a user by a distance to which the front upper protrusion 116 is projected. Additionally, the front portion and two side portions should be manufactured separately and assembled together so as to form the front upper protrusion 116 on the front portion of the casing 104. Furthermore, since the rear portion of the casing 104 on which the rear lower protrusion 118 is formed should be manufactured separately and assembled with the side portions together, the manufacture and assembly of the casing 104 is complicated.

In general, four suspension rods 112 are connected to the four corners of the casing 104, respectively. The casing 104 is tilted forward at a predetermined angle, so it is difficult to form rod supports in order to hook the suspension rods 112.

Furthermore, even when washing capacities are the same, different casings should be manufactured for the washing machine with a tilted washing tub and the washing machine with a perpendicular washing tub.

SUMMARY OF THE INVENTION

Accordingly, the present invention has been made keeping in mind the above problems occurring in the prior art, and an object of the present invention is to provide a washing machine with a tilted washing tub, which is capable of allowing laundry to be easily put into and taken out of the tilted washing tub by the removal of a front upper protrusion, which is capable of reducing the manufacturing costs of the washing machine by allowing one type of casing to be commonly used for the washing machine with the tilted washing tub and a washing machine with a perpendicular washing tub, and which allows the parts of the washing machine to be easily attached to the washing machine.

Another object of the present invention is to provide a washing machine with a tilted washing tub, which allows its rear cover, used for wiring and assembling processes, to be fitted to the rear portion of its casing in a sliding fashion, thereby facilitating the assembly of the rear cover to the casing.

In order to accomplish the above object, the present invention provides a washing machine with a tilted washing tub, comprising: a casing on the rear portion of which an opening is formed, the opening being covered with a rear cover provided with an outward protrusion; a washing tub consisting of outer and inner tubs, the outer tub being positioned in the casing to be tilted forward at a predetermined angle for containing washing water, the inner tub being positioned in the outer tub for washing and spin-drying laundry; and drive means for rotating the [outer] *inner* tub.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a perspective view showing the casing of FIG. 2;

DESCRIPTION OF THE PREFERRED EMBODIMENTS

Figure 1:
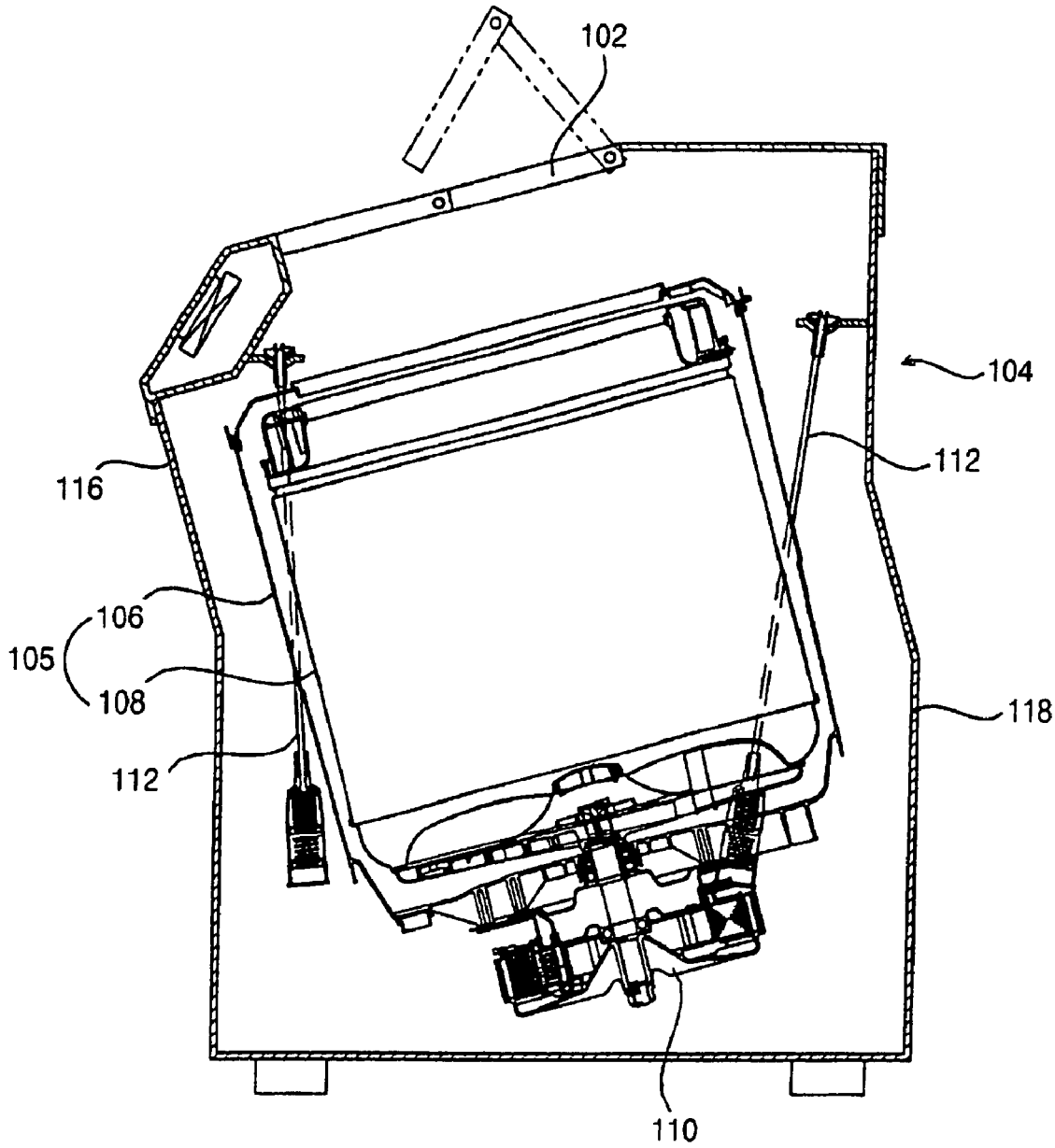
FIG.1(Prior Art)
FIG. 1 is a cross section showing a prior art washing machine with a tilted washing tub.

Reference now should be made to the drawings, in which the same reference numerals are used throughout the different drawings to designate the same or similar components.

Figure 2:
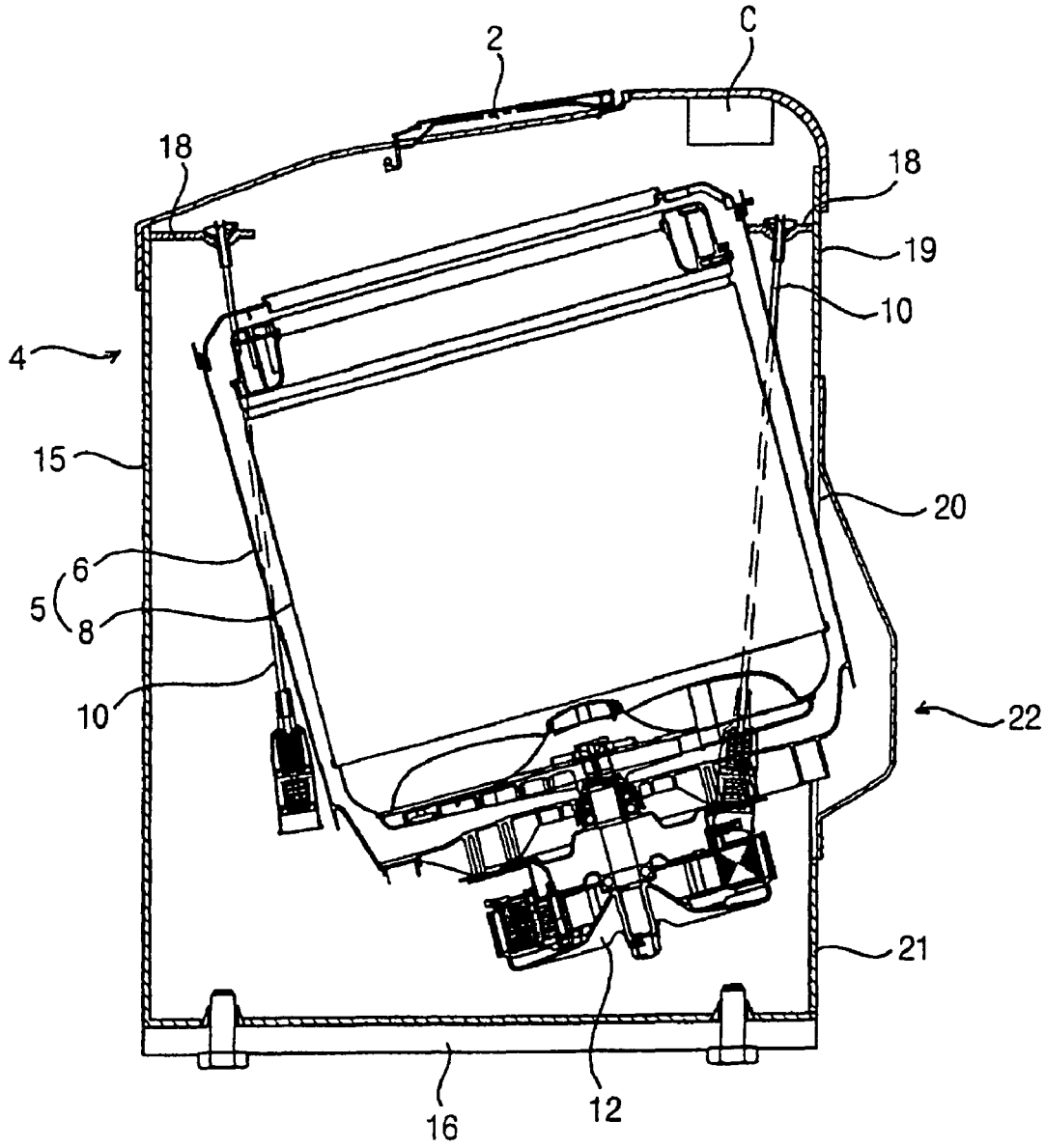
FIG. 2 is a cross section showing a washing machine in accordance with an embodiment of the present invention.

FIG. 2 is a cross section showing a washing machine in accordance with an embodiment of the present invention.

A washing machine with a tilted washing tub in accordance with an embodiment of the present invention includes a casing 4, which is provided with a folding door 2 and constitutes the outer periphery of the washing machine. A washing tub 5 is positioned in the casing 4 to be tilted forward at a predetermined angle. The washing tub 5 is comprised of an outer tub 6 situated in the casing 4 to be tilted at a predetermined angle for containing washing water, and an inner tub 8 situated in the outer tub 6 for washing and spin-drying laundry. Drive means 12 is situated under the outer tub 6 to rotate the [outer] *inner* tub 8. A plurality of suspension rods [112] *10* serve to support the outer tub 106 and damp vibrations.

As illustrated in FIGS. 2 and 3, the casing 4 includes a body, which is integrally comprised of a front portion 15 and both side portions 17 and formed to have a channel section shape. An upper plate 19 is attached to the upper sub-portion of the open portion of the casing 4. A lower plate 21 is attached to the lower sub-portion of the open portion of the casing 4 under the upper plate 19. Four load supports 18 are formed on the upper ends of the four corners of the casing 4. A base plate 16 is attached to the bottom of the casing 4. An opening 20 is formed between the upper and lower plates 19 and 21 on the rear portion of the casing 4 to facilitate a wiring process. A rear cover 22 is positioned over the opening 20 after the wiring process is carried out to connect the drive means 12 with a control unit C.

In the washing machine with a tilted washing tub of the present invention, the outer tub 6 is tilted and supported by the suspension rods 10 so as to prevent the front upper portion of the outer tub 6 from being brought into contact with the front portion of the casing 4 after the outer tub 6 is inserted into the casing 4. In this case, the rear lower portion 6 of the outer tub 6 projected rearward by the tilting of the outer tub 6 is projected through the opening 20 formed on the rear portion of the casing 4, thereby preventing the outer tub 6 from being brought into contact with the rear portion of the casing 4. The rear cover 22 is attached to the casing 4 to cover the opening 20 after a wiring process is performed utilizing the opening 20.

The rear cover 22 may be fabricated of resin or a thin iron plate. The rear cover 22 should have a protrusion 24 to prevent the outer tub 6 from being brought into contact with the rear cover 22 in consideration of the portion of the outer tub 6 projected rearward by the tilting of the outer tub 6 and the widths and magnitudes of vibrations of the outer tub 6 produced during a spin-drying process.

The upper portion of the protrusion 24 of the rear cover 22 is formed to have a slope to correspond to the slope of the tilted outer tub 6. The protrusion 24 of the rear cover 22 is preferably shaped in the form of a trapezoidal cross section in consideration of the structural strength of the rear cover 22. However, it can be shaped in the form of a triangular or circular cross section in accordance with the forming materials of the rear cover 22.

Figure 4:
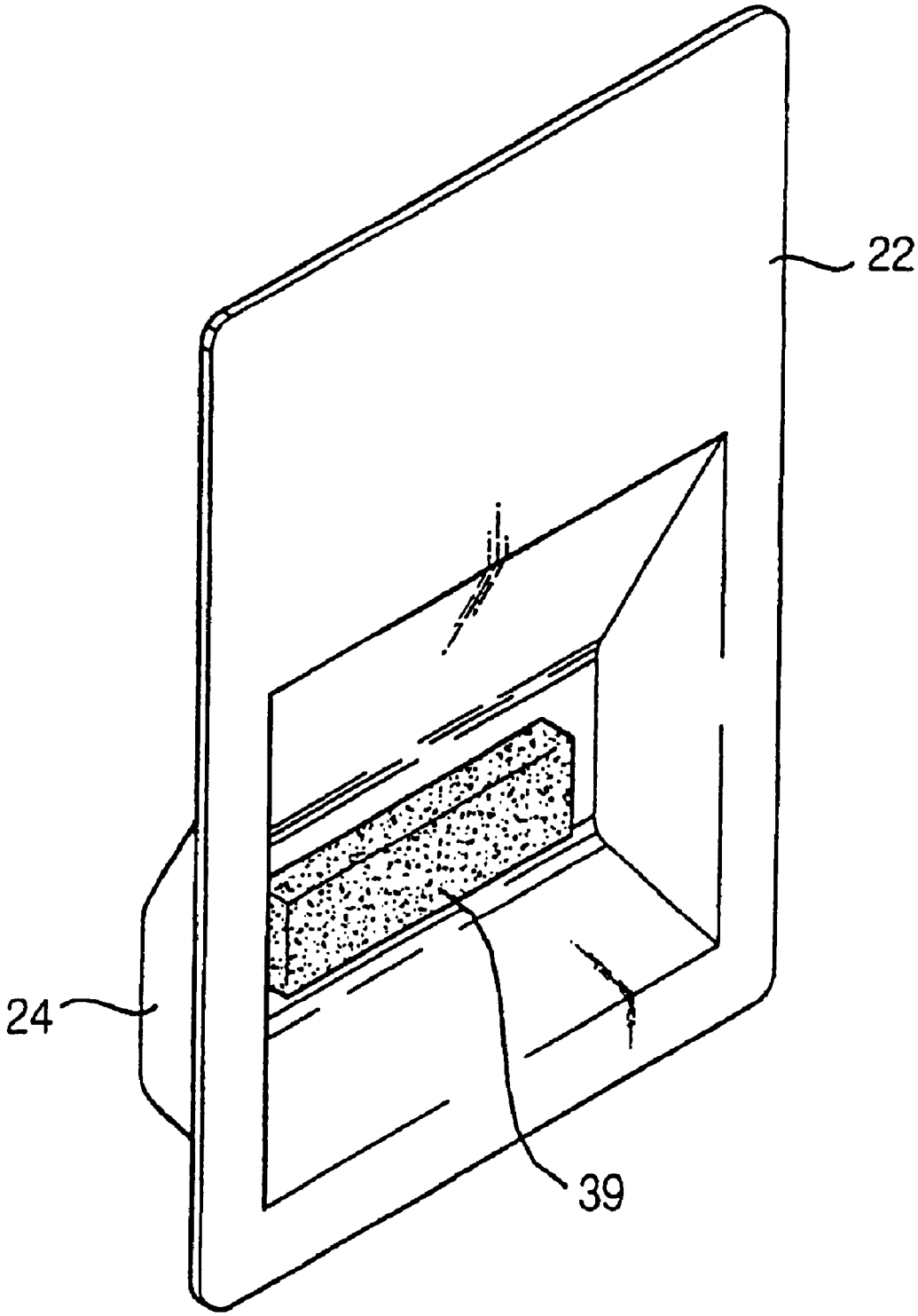
FIG. 4 is a perspective view showing the rear cover shown in FIG. 3 and a shock-absorbing element attached to the rear cover.

In addition, as shown in FIG. 4, a shock-absorbing element 39 is attached to the inner surface of the protrusion 24 of the rear cover 22 to prevent the outer tub 6 from being brought into contact with and deforming the rear cover 22 by the great vibration of the rear cover 22, thereby preventing the rear cover 22 from being damaged.

The protrusion 24 can be variously shaped according to the size and shape of the portion of the outer tub 6 projected through the opening 20 of the casing 4.

Figure 5:
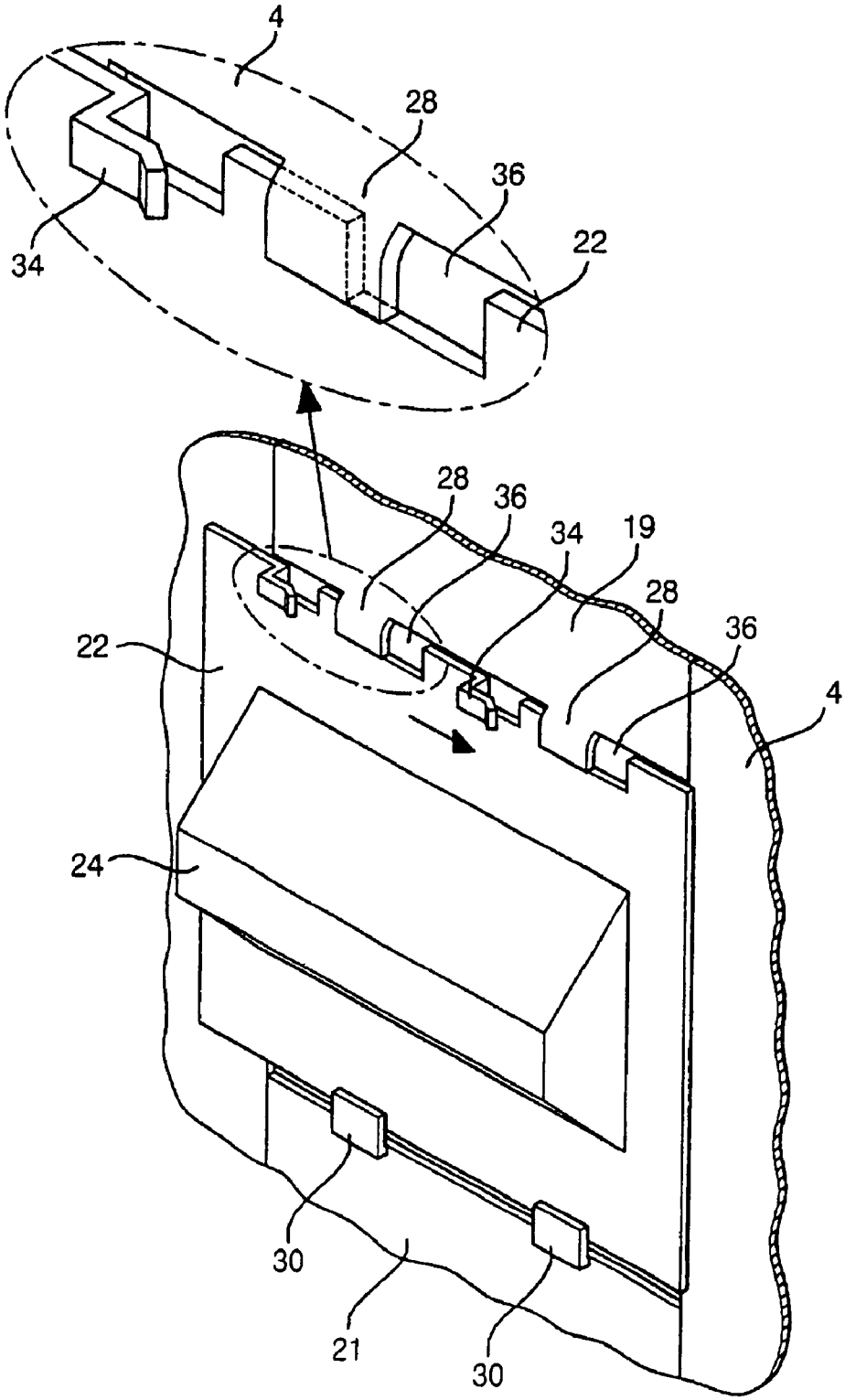
FIG. 5 is a perspective view showing a construction for assembling the rear cover and the casing together in detail.

FIG. 5 is a perspective view showing a construction for assembling the rear cover 22 and the casing 4 together in detail. A plurality of first holding projections 28 are regularly formed on the lower end of the upper plate 19 over the opening 20 so as to hold the upper portion of the rear cover 22, a plurality of second holding projections 30 are regularly formed on the upper portion of the lower plate 21 under the opening 20 so as to hold the lower portion of the rear cover 22, and elastic, laterally open clips 34, the number of which corresponds to the number of the first holding projections 30, is formed on the upper end of the rear cover 22 so as to engage with the first holding projections 30.

Additionally, a plurality of notches 36 are formed on the upper end of the rear cover 22 among the clips 34 so as to minimize the sliding distance of the rear cover 22 while the rear cover 22 is assembled with the casing 4. The elastic clips 34 are preferably bent at their open ends to the outside at a predetermined angle so as to allow the elastic clips 34 to easily engage with the first holding projections 28.

The rear cover 22 is assembled with the casing 4 in such a way that the lower portion of the rear cover 22 is held by the second holding projections 30, and the first holding projections 28 are engaged with the clips 34 of the rear cover 22 by sliding the rear cover 22 while the first holding projections 28 are made to pass through the notches 36 formed on the upper end of the rear cover 22.

As described above, the present invention provides a washing machine with a tilted washing tub in which its casing body has a hexahedral shape, thereby allowing one type of casing to be commonly used for a washing machine with a tilted washing tub and a washing machine with a perpendicular washing tub.

In addition, the front portion of the casing of the washing machine of the present invention is flat and vertical, so a user can easily put laundry into and remove laundry from its washing tub.

Furthermore, the rear cover of the washing machine of the present invention can be fitted into the casing in a slide fashion, so the rear cover can be easily attached to the casing, thereby allowing the assembly of the washing machine to be easily performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A washing machine comprising:

a casing on a rear portion of which an opening is formed, said opening being covered with a rear cover provided with an outward protrusion;

a washing tub having outer and inner tubs, said outer tub being positioned in the casing and being tilted forward at a predetermined angle for containing washing water, said inner tub being positioned in said outer tub for washing and spin-drying laundry, and wherein a rear lower portion of said tilted outer tub projects rearwardly through said opening to an internal space of the protrusion of said rear cover; and means for driving and rotating the [outer] *inner* tub.

2. The washing machine according to claim 1, wherein said casing has a front portion relatively flat and perpendicular with respect to a bottom of said washing machine.

3. The washing machine according to claim 1, wherein said casing further includes a body integrally comprised of a front portion and a pair of side portions and formed having a channel section shape, an upper plate attached to an upper sub portion of an open portion of the casing, and a lower plate attached to a lower sub-portion of the open portion of the casing under the upper plate, thereby forming said opening between said upper and lower plates.

4. The washing machine according to claim 1, wherein said protrusion of the rear cover is shaped in the form of a trapezoidal cross section.

5. A washing machine comprising:

a casing having a rear portion on which an opening is formed, said opening being covered with a rear cover provided with an outward protrusion;

a washing tub having outer and inner tubs, said outer tub being positioned in the casing and being tilted forward at a predetermined angle for containing washing water, said inner tub being positioned in said outer tub for washing and spin-drying laundry;

means for driving and rotating the outer tub; and a shock-absorbing element, said shock-absorbing element being attached to an inner surface of the protrusion of said rear cover so as to absorb impact energy when a projected portion of said tilted outer tub is brought into contact with said rear cover.

6. A washing machine comprising:

a casing having a rear portion on which an opening is formed, said opening being covered with a rear cover provided with an outward protrusion;

a washing tub having outer and inner tubs, said outer tub being positioned in the casing and being tilted forward at a predetermined angle for containing washing water, said inner tub being positioned in said outer tub for washing and spin-drying laundry;

means for driving and rotating the outer tub;

at least one first holding projection regularly formed on a lower end of said upper plate over said opening so as to hold an upper portion of said rear cover; and at least one second holding projection regularly formed on an upper portion of said lower plate under said opening so as to hold an lower portion of said rear cover.

7. The washing machine according to claim 6, further comprising one or more clips, said clips being formed on an upper end of said rear cover so as to engage with said at least one first holding projection.

8. The washing machine according to claim 7, further comprising one or more notches, said notches being formed on the upper end of said rear cover so as to allow said first holding projections to pass through said rear cover when said rear cover is assembled with the casing.

9. The washing machine according to claim 6, further comprising one or more notches, said notches being formed on an upper end of said rear cover so as to allow said at least one first holding projection to pass through said rear cover when said rear cover is assembled with the casing.

10. The washing machine according to claim 6, wherein said casing is formed to allow a rear lower portion of said tilted outer tub to be projected through said opening to an internal space of the protrusion of said rear cover.

11. A washing machine casing comprising:

a body having a front portion, a pair of side portions, a base plate along a bottom of the casing and a tub portion;

a plurality of load supports being formed on upper ends of a plurality of upper corners of the casing;

an upper portion having a folding door;

a relatively flat and perpendicular rear portion, wherein said rear portion includes an upper plate, an open portion having an open portion facilitating a connection to a power source, and a lower plate, said upper plate being engaged with an upper sub-portion of the open portion and said lower plate being engaged with a lower sub-portion of the open portion, said rear portion being in parallel with said front portion; and a rear cover covering said opening of the open portion and having a shock absorbing element, said shock-absorbing element being attached to an inner surface of said rear cover so as to absorb impact energy from said tub portion.

12. The washing machine casing according to claim 11, wherein said tub portion is for a tilted washing tub, said rear cover including a protrusion having a slope corresponding to a tilt angle of said tilted washing tub and extending in a direction away from said front portion of said casing.

13. The washing machine casing according to claim 12, further comprising:

at least one first holding projection regularly formed on a lower end of said upper plate over said opening so as to hold an upper portion of said rear cover; and at least one second holding projection regularly formed on an upper portion of said lower plate under said opening so as to hold a lower portion of said rear cover.

14. The washing machine according to claim 13, further comprising one or more clips, said clips being formed on the upper end of said rear cover so as to engage with said first holding projections.

15. The washing machine casing according to claim 11, further comprising:

at least one first holding projection regularly formed on a lower end of said upper plate over said opening so as to hold an upper portion of said rear cover; and at least one second holding projection regularly formed on an upper portion of said lower plate under said opening so as to hold a lower portion of said rear cover.

16. The washing machine according to claim 15, further comprising one or more clips, said clips being formed on the upper end of said rear cover so as to engage with said first holding projections.

17. The washing machine according to claim 15, further comprising at least one notch, said at least one notch being formed on the upper end of said rear cover so as to allow said first holding projections to pass through said rear cover when said rear cover is assembled with the casing.

18. The washing machine according to claim 15, further comprising at least one notch, said at least one notch being formed on the upper end of said rear cover so as to allow said first holding projections to pass through said rear cover when said rear cover is assembled with the casing.

19. A washing machine casing comprising:

a body having a front portion, a pair of side portions, a base plate along a bottom of the casing and a tub portion;

a plurality of load supports being formed on upper ends of a plurality of upper corners of the casing;

an upper portion having a folding door;

a relatively flat and perpendicular rear portion, wherein said rear portion includes an upper plate, an open portion having an open portion facilitating a connection to a power source, and a lower plate, said upper plate being engaged with an upper sub-portion of the open portion and said lower plate being engaged with a lower sub-portion of the open portion, said rear portion being in parallel with said front portion;

a rear cover covering said opening of the open portion;

at least one first holding projection regularly formed on a lower end of said upper plate over said opening so as to hold an upper portion of said rear cover; and at least one second holding projection regularly formed on an upper portion of said lower plate under said opening so as to hold a lower portion of said rear cover.

20. The washing machine casing according to claim 19, wherein said tub portion is for a tilted washing tub, said rear cover including a protrusion having a slope corresponding to a tilt angle of said tilted washing tub and extending in a direction away from said front portion of said casing.

* * * * *